Sept. 15, 1931.   C. DORNIER   1,823,730
FLOAT FOR FLYING MACHINES
Filed Oct. 22, 1928
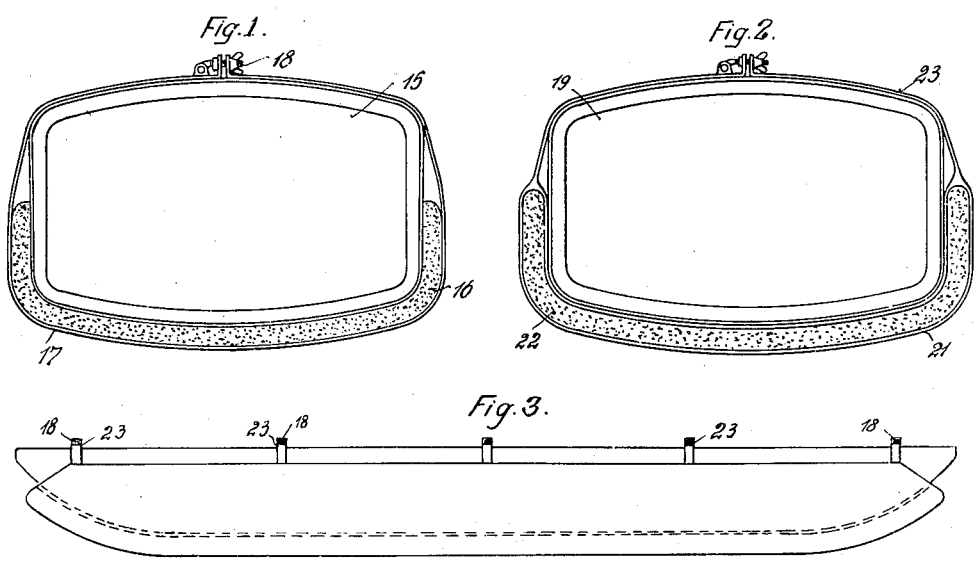
Inventor:
Claude Dornier
by Kunchaun
Atty.

Patented Sept. 15, 1931

1,823,730

UNITED STATES PATENT OFFICE

CLAUDE DORNIER, OF FRIEDRICHSHAFEN-ON-THE-BODENSEE, GERMANY, ASSIGNOR OF ONE-HALF TO THE FIRM DORNIER-METALLBAUTEN G. M. B. H., OF FRIEDRICHS-HAFEN-ON-THE-BODENSEE, GERMANY

FLOAT FOR FLYING MACHINES

Application filed October 22, 1928, Serial No. 314,255, and in Germany January 12, 1928.

My invention refers to floats, more especially for use in connection with flying machines. Its main object is to provide means whereby such floats are protected against damage when settling on the surface of the water.

As is well known to those skilled in the art, the floats hitherto used in connection with hydroplanes, flying boats and the like are subject to damage and destruction by their impact on the water both when descending and starting. I succeed according to this invention in preventing all damage by lining the bottom and if desired also the adjoining parts of the side walls of floats with a protective covering consisting of elastic material, which serves at the same time as a buffer and a reinforcement. A covering consisting partly or entirely of a highly elastic material such as rubber, more especially in the form of cellular rubber (rubber sponge, rubber froth etc.) or air in the form of an air cushion or pneumatic bag will be preferable. I protect this covering on the outside by a watertight skin which prevents the entrance of water into these cavities which would be followed by an increase in weight.

I attach the protective skin to the float in a disengageable manner so that after removal of the skin or simultaneously therewith the elastic covering can be removed also.

In the drawings affixed to this specification and forming part thereof several forms of a float embodying my invention are illustrated diagrammatically by way of example.

In the drawings,

Figs. 1 and 2 are vertical cross-sections and

Fig. 3 is a side elevation.

Figs. 1 and 2 being illustrative of two forms of floats having highly elastic coverings attached to them by means of a watertight skin.

Fig. 3 being a side elevation of the float illustrated in Fig. 2.

Referring first to Fig. 1, 15 is the float, which may be of any well known construction.

This float is provided with a protective covering 16 of cellular rubber or the like. A watertight skin 17 holding the covering applied against the bottom and part of the side walls of the float, extends all over the float surface, its top edges being held together by suitable locking means indicated at 18 which may be screw bolts, eccentric levers or the like.

In the modification illustrated in Figs. 2 and 3 the float 19 is also enveloped in a watertight skin disengageably mounted thereon, however, in this case this skin forms part of a closed envelope or cushion 21, which may be filled with compressed air or with a highly elastic material 22 such as cellular rubber or the like. This envelope, cushion or bag is disengageably attached to the float by means of belts, strips or the like 23 so that it can easily be mounted in place or removed.

I wish it to be understood that I do not desire to be limited to the exact details of construction for obvious modifications will occur to a person skilled in the art.

I claim:—

1. Float for flying machines comprising a substantially rigid hollow float body, a permanently active, highly elastic covering mounted on the outer surface of the bottom and part of the side walls of said float body and means disengageably attached to said float body for holding said covering in contact with said float body.

2. Float for flying machines comprising a substantially rigid hollow float body, a permanently active, highly elastic covering having the form of an air cushion mounted on the outer surface of the bottom and part of the side walls of said float body and means disengageably attached to said float body for holding said covering in contact with said float body.

3. Float for flying machines comprising a substantially rigid hollow float body, a permanently active, highly elastic hollow covering filled with cellular rubber mounted on the outer surface of the bottom and part of the side walls of said float body and means disengageably attached to said float body for holding said covering in contact with said float body.

In testimony whereof I affix my signature.

CLAUDE DORNIER.